United States Patent [19]

Tanaka et al.

[11] 4,379,648

[45] Apr. 12, 1983

[54] FIXING STRUCTURE FOR RADIATOR GRILLE

[75] Inventors: Shinken Tanaka, Tokyo; Takuo Yuda, Yokohama, both of Japan

[73] Assignees: Nissan Motor Co., Ltd.; Nifco Inc., both of Yokohama, Japan

[21] Appl. No.: 225,028

[22] Filed: Jan. 14, 1981

[30] Foreign Application Priority Data

Jan. 21, 1980 [JP] Japan .............................. 55-4497[U]

[51] Int. Cl.³ ............................................ F16B 19/00
[52] U.S. Cl. ..................................... 403/24; 403/406; 52/507
[58] Field of Search .......................... 403/24, 406, 405; 52/507, 511; 411/508, 509, 510; 296/31 P; 180/68 P; 24/214 R, 213, 305, 336, 297

[56] References Cited

U.S. PATENT DOCUMENTS

| 4,114,339 | 9/1978 | Ito | ..................................... 24/214 X |
| 4,261,151 | 4/1981 | Ito | ......................................... 52/511 |

Primary Examiner—Andrew V. Kundrat
Attorney, Agent, or Firm—Trexler, Bushnell & Wolters, Ltd.

[57] ABSTRACT

The fixture part on a radiator grille to be fixed to an automobile body is formed of a plate member incorporating a retaining step therein, while the fastener to be fastened to the fixture part is formed of an engaging arm incorporating an engaging claw for attachment to the retaining step in the plate member of the fixture part and pinching members adapted to cooperate with said engaging arm to squeeze the plate member of the fixture part of the grille. When the grille is fastened to the automobile body by use of the fastener, occurrence of play in the portion of engagement is completely precluded.

4 Claims, 8 Drawing Figures

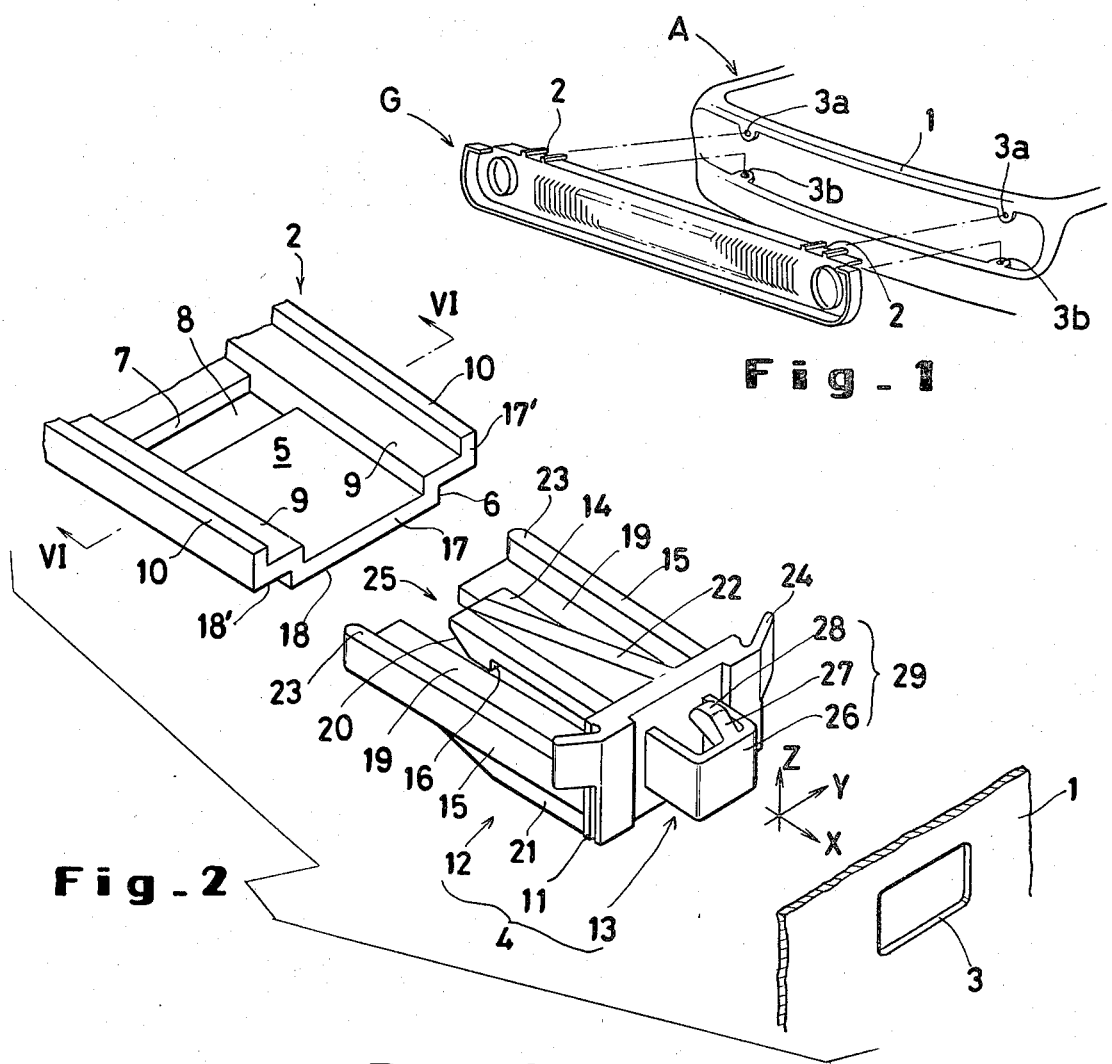
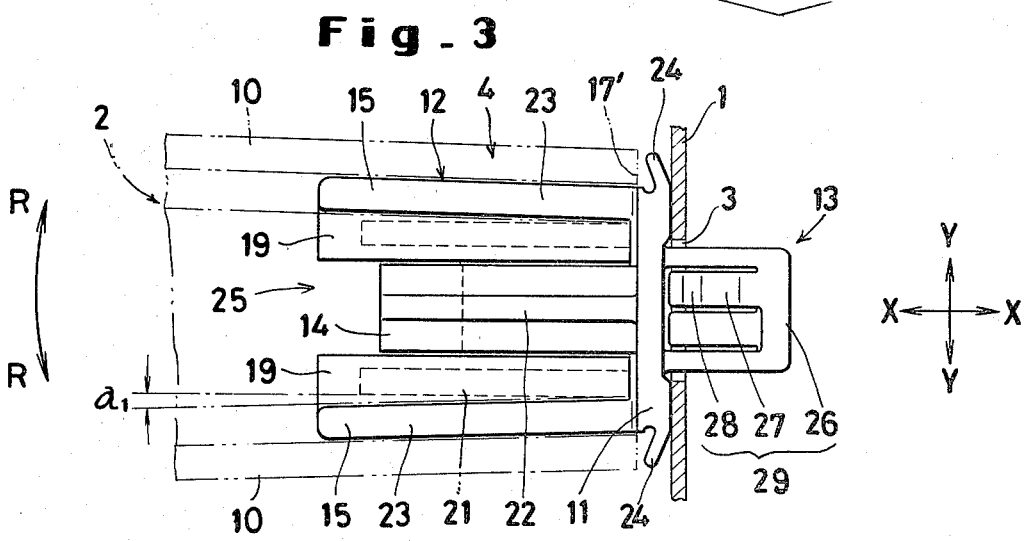

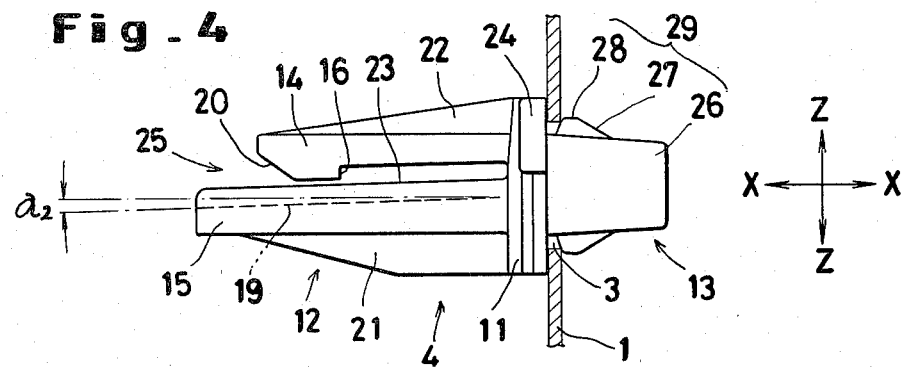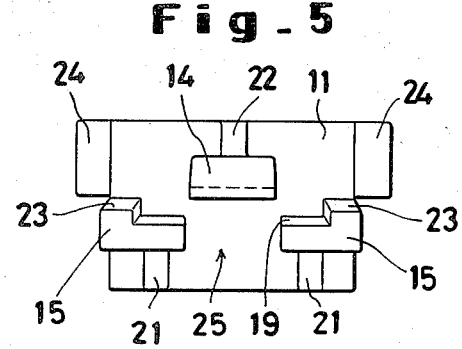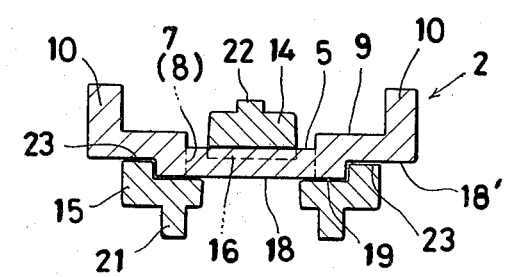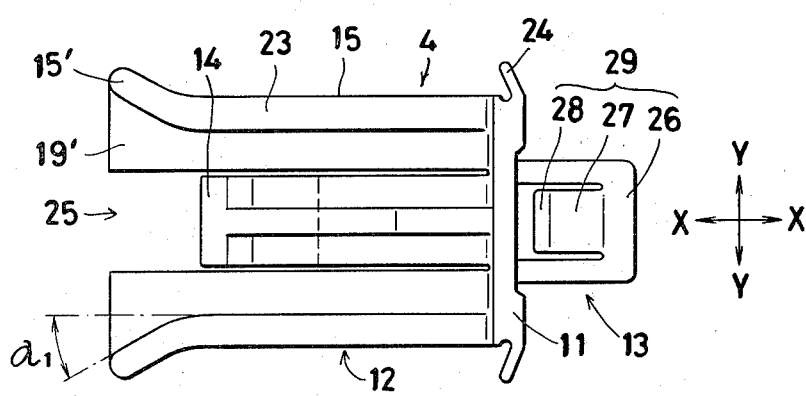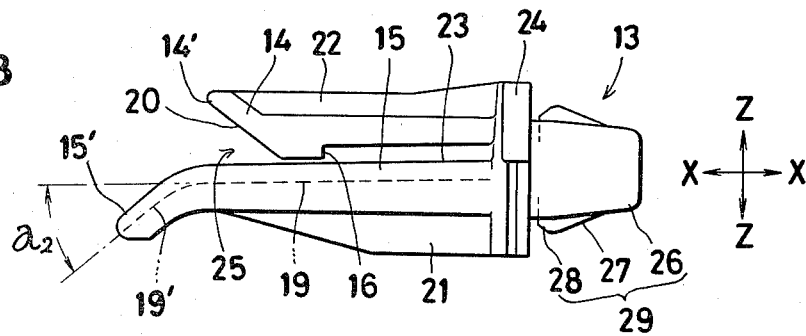

FIXING STRUCTURE FOR RADIATOR GRILLE

BACKGROUND OF THE INVENTION

This invention relates to a fixing structure for fastening a radiator grille to an automobile body.

As means for fixing to an automobile body a radiator grille designed for radiation of heat and decoration of the front of the automobile body, it is customary to use bolts and nuts or plastic fasteners. The recent trend is toward increasing adoption of plastic fasteners which offer great handling convenience and excel in ability to absorb shocks. In general design, these plastic fasteners comprise a base plate and engaging means such as anchors or hooks formed one each on the opposite surfaces of the base plate. These plastic fasteners are interposed between the engaging openings which are formed in advance in a given radiator grille and an automobile body at suitably selected opposed positions and the fasteners' engaging means are brought into fast engagement with the openings by pressing the radiator grille against the automobile body. Such conventional plastic fasteners, however, have the disadvantage that play arises between the engaging means and the openings unless the openings formed in the radiator grille and the automobile body are exactly located relative to each other and are made exact in size. The plastic fasteners have another disadvantage in that when the radiator grille fixed to the automobile body expands or contracts as the temperature of the ambient air rises or falls, play arises between the plastic fasteners and the openings and, in an extreme case, the plastic fasteners sustain cracks under heavy stress.

Fasteners specially designed to prevent such play between the radiator grille and the automobile body have been developed. None of these fasteners, however, have been able perfectly to preclude the possible occurrence of such play in all conceivable directions.

SUMMARY OF THE INVENTION

An object of this invention is to provide a fixing structure for a radiator grille, which easily and securely fixes a radiator grille to an automobile body and perfectly prevents play from developing between the radiator grille and the automobile body.

To accomplish the object described above according to this invention, there is provided a fixing structure which comprises a fixture part formed on a radiator grille and composed of a plate member incorporating a retaining step and lateral walls formed along the opposite sides of the plate member; and a fastener composed of a base plate and an attaching member formed on at least one side of the base plate, which attaching member is composed of an engaging arm extended from the base plate and provided at the leading end thereof with an engaging claw and one pair of pinching members extended from the base plate parallelly along the opposite sides of the engaging arm.

As the fastener is fully inserted into the fixture part on the grille, the engaging claw of the fastener is self-locked on the retaining step of the fixture part, completing fast union between the fixture part and the fastener. Once this union is established, the fixture part is retained fast in position and prevented from producing any play owing to the pressure applied thereto from any of its four sides by the engaging arm and the pinching members. Provision of a suitable reinforcing rib adds all the more to the fastness with which the fixture part is retained in position.

The other objects and characteristics of the present invention will become apparent from the following detailed description of the invention with reference to the accompanying drawing.

BRIEF EXPLANATION OF THE DRAWING

FIG. 1 is a schematic perspective view of the positions to which the present invention is applied.

FIG. 2 is an exploded perspective view of the first embodiment of the present invention.

FIG. 3 through FIG. 5 are a plan view, side view and front view respectively of the fastener of the first embodiment of this invention.

FIG. 6 is a sectioned view taken along the line VI—VI of FIG. 1 and illustrates the condition in which the main part of the fastener is fixed in position.

FIG. 7 and FIG. 8 are a plan view and side view respectively of the fastener of the second embodiment of this invention.

DESCRIPTION OF THE PREFERRED EMBODIMENTS

This invention relates to a radiator grille fixing structure for easily and securely fastening a radiator grille to an automobile body without producing any play.

Generally, to fasten a radiator grille G to a fitting portion 1 of an automobile body A, there is followed the practice of having fixture parts 2 formed in advance on the grille G, interposing fixing means such as plastic fasteners between these fixture parts and fixing holes 3 formed in advance in the fitting portion 1 and thereafter pressing the grille G against the automobile body A. The fixing structure involved in this case comprises fixing holes 3a to receive the fasteners horizontally and fixing holes 3b to receive them vertically, though these two kinds of fixing holes permit attachment of the fasteners in the same manner. FIG. 2 which partially illustrates the fixing parts provided by the present invention for the union of the automobile body and the radiator grille represents a case wherein fasteners are used in a horizontal condition.

A fixing hole 3 is opened at a suitable position in the fitting portion 1. The fixture part 2 of the radiator grille G is generally formed integrally with the grille G made of a plastic material. When necessary, the fixture part 2 may be produced separately of the grille G and subsequently fastened by a suitable means to the grille G.

The fixture part 2 which is formed integrally with the grille G as illustrated in FIG. 2 possesses a plate member 5 extended in the fixing direction (indicated by the arrow X), and this plate member 5 is defined on its opposite sides with lateral walls 6 and is provided with a retaining step 7 adapted to grip an engaging claw of the fastener. In the present embodiment, this retaining step 7 is produced in the form of an edge of a perforation 8 opened through the plate member 5. The fixture part 2 formed on the grille, in its simplest design, may be formed of the two lateral walls 6 and the retaining step 7. It is, nevertheless, desired to be additionally provided at the upper ends of the two lateral walls one each with outwardly extended pieces 9 and further at the outer extremities of the extended pieces 9 one each with raised pieces 10.

A fastener 4 is integraly molded of a plastic material and is basically formed of a base plate 11 and first and second attaching members 12, 13 extended in opposite directions from the base plate 11. Since the first attaching member 12 is meant for engagement with the fixture part 2, it is given a structure peculiar to the present invention. Basically it is composed of an elastic engaging arm 14 and a pair of pinching members 15 parallelly extended along the opposite sides of the arm 14. The engaging arm 14 is extended outwardly from one side of the basic plate 11 and is provided on the underside near the leading end thereof with an engaging claw 16 to be hooked on the retaining step 7 in the fixture 2 part of the grille. The leading end of the engaging arm is slanted into a tapered edge 20. The distance between the engaging claw 16 and the face of the base plate 11 is nearly equal to the distance between the retaining step 7 in the fixture part 2 and the leading end face 17.

The pair of pinching members 15 are similarly extended outwardly from the base plate 11. The interval between the inner surfaces of the pinching members 15 is equal to that between the outer surfaces of the lateral walls 6 of the fixture part 2. In the present embodiment, the pinching members 15 are further provided each with a flat member 19 to come into contact with the lower face 18 of the fixture part 2. Although it is also acceptable for the flat members to be formed in a continuous body in the Y-direction, the fastener can be molded more easily by use of only two molding dies if the flat members are separated from each other by a space equalling the width of the arm 14. In the light of this convenience, it is desirable to form a slit below the engaging arm as illustrated in FIGS. 3 and 5.

When the flat members 19 are provided, the distance between the flat members 19 and the engaging arm 14 disposed thereabove is equal to or slightly smaller than the thickness of the plate member 5 of the fixture part 2 (FIG. 4). Consequently, the engaging claw 16 is allowed to force its way into the gap between the flat members 19 and the engaging arm 14.

Attachment of the fastener 4 to the fixture part 2 is accomplished as follows.

The inner surfaces of the two pinching members 15 are slid over the opposite lateral walls 6 of the fixture part 2 and the flat members 19 are brought into contact with the lower face 18 of the fixture part 2. Then the fastener 4 is pushed in toward the fixture part 2. Consequently, the engaging claw 16 which lies below the surface of the plate member 5 comes to collide with the leading face 17 of the fixture part 2. The tapered edge 20 rides over the upper edge of the leading face 17 with the engaging arm 14 being bent upwardly. As the push given to the fastener 4 is further continued, the fastener 4 slides in further with the plate member 5 pinched between the engaging arm 14 and the two pinching members 15. Eventually, the engaging claw 16 drops into the perforation 8 and comes into unbreakable engagement with the associated retaining step 7. At this point, the base plate 11 collides with the leading end face 17 of the fixture part 2.

As is evident from FIG. 6 which illustrates the condition of this engagement as in the section taken along the line VI—VI of FIG. 2, the opposite sides (lateral surfaces 6) of the fixture part 2 are retained fast by the two pinching members 15. When the rigidity of the two pinching members 15 is increased, therefore, the freedom of motion of the fixture part 2 in the direction of the arrow Y is suppressed to the point where the fixture part is completely prevented from producing any play. Provision of ribs 21 one each for the flat members 19 on the undersides thereof in the direction of length is effective in reinforcing the pinching members 15 and the flat members 19. The fact that reinforcing means can be incorporated at suitable positions as occasion demands is also characteristic of the present invention. Unlike the conventional fasteners which are designed to produce desired union by being received into perforations or cylindrical fixture parts, the fastener of the present invention forms an outer shell and thus eliminates all restrictions on the wall thickness of the pinching members. It is nevertheless necessary that all the component parts of the fastener should be given enough flexibility for amply absorbing deviations of the fixture part within the range of positional tolerance between the grille and the automobile body.

Possible vibration of the fixture part 2 in the direction of the arrow X can be amply curbed by the cooperation of the engaging claw 16 and the base plate 11.

Possible freedom of motion in the direction of the arrow Z is completely eliminated by the fixture part 2 being squeezed between the flat members 19 and the engaging arm 14. It is important that the engaging arm 14 should have sufficient resiliency to enable the engaging claw 16 to ride onto the surface of the plate member 5 and sufficient rigidity to enable the fixture part to be retained fast in position. The engaging arm 14, therefore, is provided on the upper surface thereof with a rib tapered off toward the leading end thereof, so that the rigidity of the engaging arm as a whole will be enhanced and the resiliency of the engaging arm will be amply retained in the neighborhood of the leading end. In the fixture part 2, when the reverse sides 18' of the outwardly extended pieces 9 of the plate member 5 are given dimensions as illustrated so that the reverse sides come into intimate contact with the upper sides 23 of the two pinching members, the required retaining force in the direction of the arrow Z can be produced amply between the reverse sides 18' and the engaging arm 14 even in the absence of the aforementioned flat members.

The base plate 11 is desired to be provided at each of the opposite lateral edges thereof with a resilient piece 24 extended at an angle toward the fixture part 2. These resilient pieces 24 are formed so that their leading ends will confront or come into slight contact with the leading end faces 17' of the raised side pieces 10 of the fixture part. To facilitate the comprehension of the condition of engagement between the two parts, the raised side pieces 10 alone are indicated by imaginary lines in FIG. 3. The resilient pieces 24 incorporated as described above offer thorough resistance to any bending stress produced in the direction of the arrow R.

For the purpose of facilitating the work of attaching the fastener 4 described above, the fixture part 2 as a whole may be formed in a shape slightly converging in the direction of the leading end and the first attaching member 12 of the fastener 4 may be proportionately formed in a reversely diverging shape (with an angle of $\alpha_1$). Further, the flat members 19 and the upper sides 23 may be tapered (with an angle of $\alpha_2$) as illustrated in FIG. 4. These tapered faces will be better understood by reference to the front view of FIG. 5.

Otherwise, the two pinching members 15 may be formed so that their inner walls converge in the direction of the leading ends of the pinching members. The convergence of the inner walls serves to enhance the pinching force produced between the pinching members 15.

Further, as in the second embodiment illustrated in FIGS. 7 and 8, only the entrance 25 to the space defined by the two pinching members 15 and the engaging arm 14 may be formed so as to diverge toward the leading end. In this case, the fixture part 2 may retain its rectangular shape unchanged. Particularly in the embodiment illustrated in FIGS. 7 and 8, the leading ends 15' of the pinching members 15 are sharply diverged and, at the same time, the leading ends 19' of the flat members 19 which perpendicularly intersect the pinching members are similarly sharply bent downwardly and the leading end 14' of the engaging arm 14 is slanted to produce a relatively long inclined surface. Consequently, there is formed a particularly large entrance.

Also in this second embodiment, the other component members are similar to those in the first embodiment and, therefore, are denoted by the same symbols in the drawing.

The work of attaching the grille to the automobile body is completed by causing the fastener 4 which has been attached fast to the fixture part 2 to be brought, as held on the grille, into snapping engagement with the fixing hole 3 in the fitting portion 1 of the automobile body.

In the meantime, the second attaching member 13 is not particularly defined by this invention. Any of the known devices such as fasteners and plastic rivets may be used as the second attaching member. In the illustrated embodiment, a modification of the anchor type device is selected from among the devices classified into anchor type, canoe type and hook type, for example. Briefly, a resilient engaging member 29 is obtained by forming a hollow shank 26 projecting from the base plate 11 in the direction of the arrow X and incorporating a pair of resilient engaging pieces 27 extended from the upper and lower leading edges of the shank 26 in the direction of the base plate 11 and provided one each with an outwardly swelled portion 28. The front side of the shank 26 has a rectangular shape. The fixing hole 3 in the fitting portion 1, therefore, is required to have a rectangular shape in conformity therewith.

As the shank is inserted in the direction of its leading end into the fixing hole 3, the resilient engaging pieces 27 continue to advance past the fixing hole while being bent inwardly by the edges of the fixing hole. After the swelled portions 28 have slid past the hole, the resilient engaging pieces 27 snap back to their original shape by virtue of their own resiliency. Consequently, the swelled portions 28 and the base plate 11 are pressed against the obverse and reverse edges of the fixing hole and are retained fast in position. In the fastener of the first embodiment, the pair of resilient engaging pieces 27 are laterally staggered relative to each other as seen in a plan view so that the fastener as a whole may be molded in a simple two-piece metal die. In contrast, in the fastener 4 of the second embodiment, the swelled portion 28 of great width may be molded by using a three-piece metal die to ensure the stability of the engagement of the swelled portion with the fixing hole 3.

As illustrated in FIG. 1, two fixture parts 2 are parallelly disposed at a fixed lateral interval, for example. This means that there is a possibility of the lateral interval between the two fixture parts being varied as by the deviation from the manufacturing tolerance of radiator grilles. To absorb the variation, therefore, the fixing holes 3 formed in the fitting portion 1 are desired to be given an additional length in the horizontal direction in which they both fall. To prevent the fastener from acquiring freedom of rotation about its center, the shank 26 and the fixing hole 3 are both formed in a rectangular shape. Optionally, the shank 26 may be formed to possess circular cross section. The fastener 4 may be attached to the fitting portion 1 before the fixture part 2 is brought into engagement with the fastener. This procedure may be reversed when necessary.

As described in detail above, the present invention provides a fixing structure which is capable of retaining, with ample strength and stability, the fixture parts formed on the radiator grille and is excellent in tolerance to errors occurring in the manufacture of radiator grilles.

What is claimed is:

1. A fixing structure for fastening a radiator grille to the fitting portion of an automobile body, comprising a fixture part formed on the radiator grille and a plastic fastener composed of a base plate, a first attaching member formed on one side of said base plate and adapted for attachment to said fixture part and a second attaching member formed on the other side of said base plate and adapted for snapping engagement with a fixing hole in the fitting portion of the automobile body part, said fixture part being composed of a plate member incorporating therein a retaining step and lateral walls disposed one each along the opposite edges of said plate member, and said first attaching member being composed of a base plate, an engaging arm extended from said base plate and provided at the leading end thereof with an engaging claw adapted for engagement with said retaining step in said fixture part, and a pair of pinching members extended from said base plate parallelly to both sides of said engaging arm and adapted to squeeze the lateral walls of said fixture part after completion of engagement between the fixture part and the plastic fastener.

2. The fixing structure according to claim 1, wherein said engaging arm of said first attaching member is provided on the upper surface thereof with a rib formed in a shape converging in the direction of the leading end of said engaging arm and said pinching members are provided each on the underside thereof with a rib.

3. The fixing structure according to claim 1 or 2, wherein the base plate of said first attaching member is provided at each of the opposite lateral edges with a resilient piece extended at an angle toward said fixture part.

4. The fixing structure according to claim 1, 2 or 3, wherein said fixture part is formed in a shape converging toward the leading end and said first attaching member is formed in a shape diverging toward the leading end thereof.

* * * * *